United States Patent
Borgen

(10) Patent No.: US 9,194,373 B2
(45) Date of Patent: Nov. 24, 2015

(54) AIR COOLING OF WIND TURBINE GENERATOR

(71) Applicant: SWAY TURBINE AS, Bergen (NO)

(72) Inventor: Eystein Borgen, Radal (NO)

(73) Assignee: Sway Turbine AS, Bergen (NO)

( * ) Notice: Subject to any disclaimer, the term of this patent is extended or adjusted under 35 U.S.C. 154(b) by 66 days.

(21) Appl. No.: 14/346,974

(22) PCT Filed: Sep. 26, 2012

(86) PCT No.: PCT/EP2012/068925
§ 371 (c)(1),
(2) Date: Mar. 25, 2014

(87) PCT Pub. No.: WO2013/045473
PCT Pub. Date: Apr. 4, 2013

(65) Prior Publication Data
US 2014/0217744 A1      Aug. 7, 2014

(30) Foreign Application Priority Data
Sep. 26, 2011   (GB) .................................. 1116546.1

(51) Int. Cl.
| | |
|---|---|
| *H02K 9/04* | (2006.01) |
| *F03D 9/00* | (2006.01) |
| *F03D 11/00* | (2006.01) |
| *H02K 7/18* | (2006.01) |
| *H02K 9/06* | (2006.01) |
| *F03D 11/04* | (2006.01) |

(52) U.S. Cl.
CPC ............... *F03D 9/002* (2013.01); *F03D 11/00* (2013.01); *F03D 11/04* (2013.01); *H02K 7/1838* (2013.01); *H02K 9/06* (2013.01); *F05B 2220/706* (2013.01); *F05B 2220/7066* (2013.01); *F05B 2260/20* (2013.01); *Y02E 10/722* (2013.01); *Y02E 10/725* (2013.01)

(58) Field of Classification Search
CPC .......................................................... H02K 9/04
USPC ............................................................ 290/55
See application file for complete search history.

(56) References Cited

U.S. PATENT DOCUMENTS

| | | | | |
|---|---|---|---|---|
| 2,050,129 | A  * | 8/1936 | Scholes ...................... | 416/210 R |
| 2008/0292467 | A1* | 11/2008 | Borgen ...................... | 416/244 R |
| 2010/0133838 | A1* | 6/2010 | Borgen ........................... | 290/52 |
| 2011/0193349 | A1* | 8/2011 | Borgen et al. .................. | 290/55 |

FOREIGN PATENT DOCUMENTS

| | | | | |
|---|---|---|---|---|
| EP | 58791 | A1 * | 9/1982 | ............. H02K 21/24 |
| GB | 2494925 | A  * | 3/2013 | |

* cited by examiner

*Primary Examiner* — Joseph Waks
(74) *Attorney, Agent, or Firm* — Mark M. Friedman

(57) ABSTRACT

A wind turbine axial flux generator for converting wind into electricity includes: a generator rotor which is rotatable about an axis; and a stator; wherein one of the generator rotor and the stator is provided with magnets and the other is provided with electrical windings in which electricity is induced by relative movement between the generator rotor and the stator; and wherein the generator further includes: an up-wind air gap on the up-wind side of the electrical windings, between the electrical windings and at least some of the magnets on the up-wind side of the electrical windings; a down-wind air gap on the down-wind side of the electrical windings, between the electrical windings and at least some of the magnets on the down-wind side of the electrical windings; and at least one wind guide for directing the wind so that the wind flows through both the up-wind air gap and the down-wind air gap in order to cool the electrical windings from both the up-wind and down-wind sides of the electrical windings.

22 Claims, 4 Drawing Sheets

AIR COOLING OF WIND TURBINE GENERATOR

FIELD OF THE INVENTION

The invention relates to wind turbine generators. The invention may include shaping of structural parts of the wind turbine generator stator and rotor for enhancing cooling of the generator. The invention is applicable to both offshore and onshore applications.

BACKGROUND OF THE INVENTION

It is known to position wind turbines both offshore (at sea) and onshore (on land) for the purpose of converting wind energy into other forms of energy, such as electrical energy.

SUMMARY OF THE INVENTION

The invention provides a wind turbine generator as set out in the accompanying claims.

The invention may include shaping of structural parts of the wind turbine generator stator and rotor for enhancing cooling of the generator.

The invention is particularly applicable to wind turbine axial flux generators. An axial flux generator is a generator in which lines of magnetic flux between magnets, through the electrical coils, are directed generally in an axial direction, that is generally parallel with the axis of rotation of the generator rotor.

Embodiments of the invention will now be described, by way of example only, with reference to the accompanying drawings.

DESCRIPTION OF PREFERRED EMBODIMENTS

Figure 1:
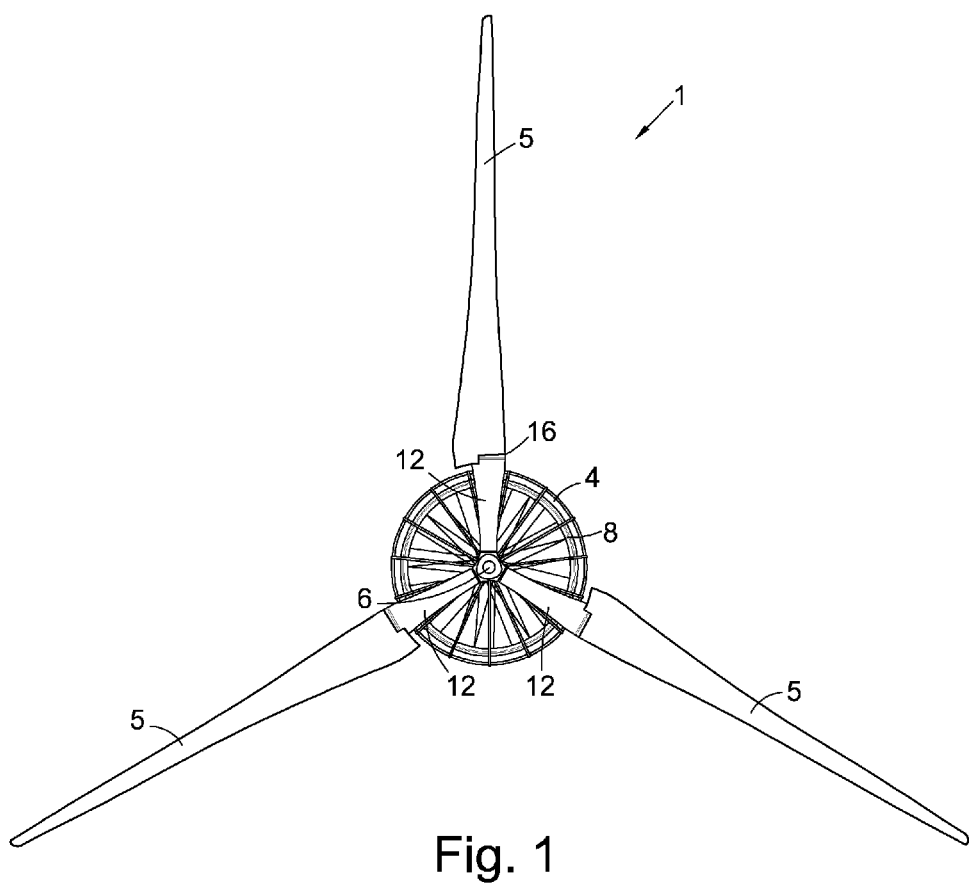
FIG. 1 shows a wind turbine rotor which forms part of a wind turbine.

FIG. 1 shows a wind turbine rotor 1 which is suitable for mounting on a wind turbine tower (not shown). The embodiment described is suitable for large wind turbines which may generate for example 5 to 10 megawatts of electricity, and where the weight of the rotor 1 may for example be in the range of 30 to 400 tonnes (ie. 30,000 to 400,000 Kg).

The main components of the wind turbine rotor 1 are a blade rotor 2, and a generator comprising a generator rotor 4 and a stator 8. The blade rotor 2 comprises three blades 5 which are each supported by a blade support 12 as will be described below.

Figure 2:
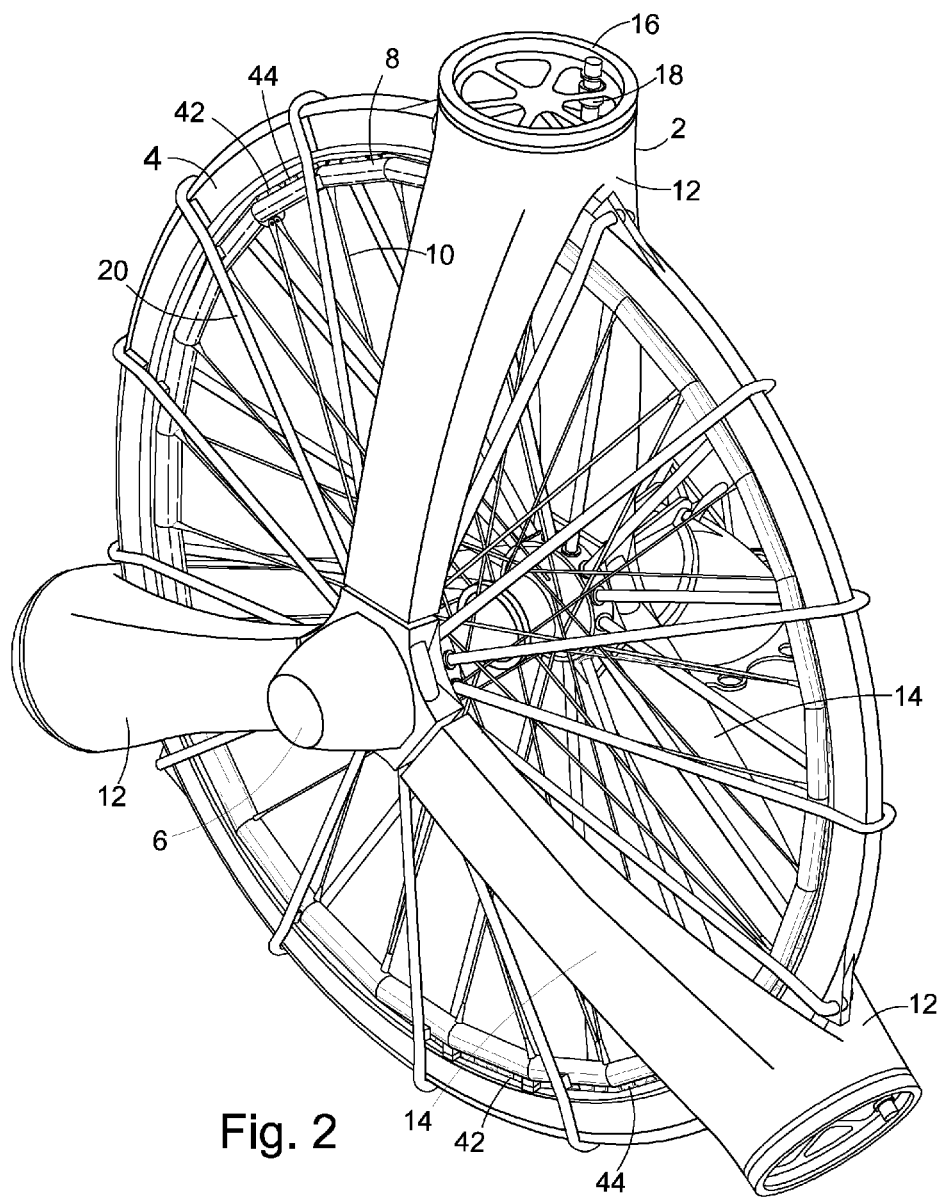
FIG. 2 shows the central part of the wind turbine rotor, and shows three blade supports straddling a generator.

FIG. 2 shows the central part of the wind turbine rotor 1. The blade rotor 2 and the generator rotor 4 are both rotatably mounted on a shaft 6. A stator 8 is supported by spokes 10, and does not rotate about the shaft 6. The generator rotor 4 and the stator 8 together form a generator which generates electricity.

The blade rotor 2 comprises three blades 5 (shown in FIG. 1) which are supported by three blade supports 12. Each blade support 12 has two legs 14 which straddle the generator rotor 4 and the stator 8, and which are rotatably mounted on the shaft 6 at spaced positions.

Each blade support 12 is provided with a pitch bearing 16 which allows a blade 5 attached to the blade support 12 to be rotated by a pitch motor 18. This allows the pitch of each blade 5 to be adjusted to suit the current wind speed and power requirements. In alternative embodiments the pitch bearing 16 can be omitted, and the blades 5 could for example be integrally formed with the blade supports 12.

The generator rotor 4 is supported by a number of supporting members 20, which are arranged as a number of A-frames, and which are rotatably mounted on said shaft 6. The generator rotor 4 carries permanent magnets around its circumference. The stator 8 is provided with electrical windings which are positioned within the magnets of the generator rotor 4. Relative movement between the magnets of the generator rotor 4 and the electrical coils of the stator 8 generates electricity. The electrical coils may or may not have an iron core.

Figure 3:
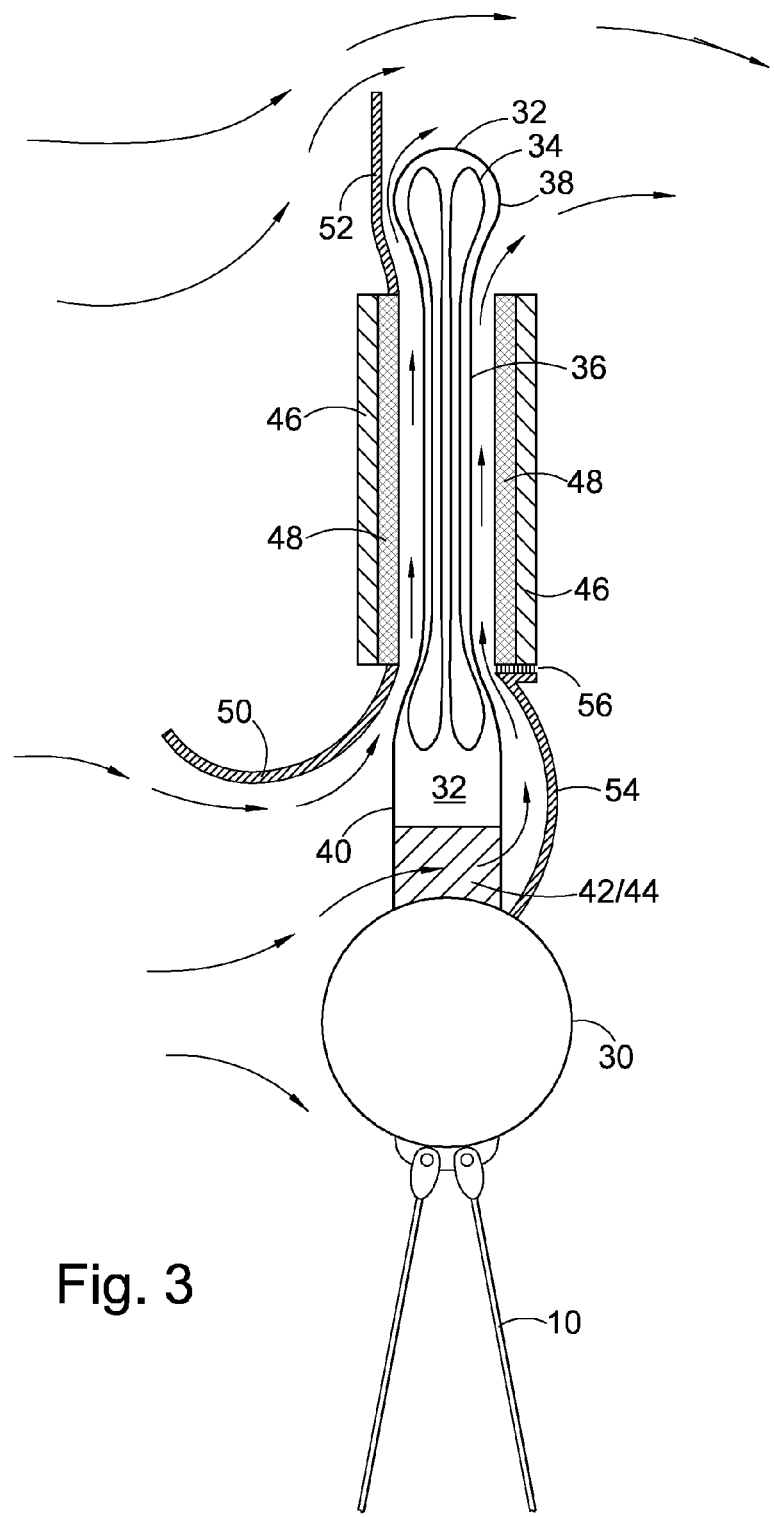
FIG. 3 is a cross-sectional view showing how the stator and generator rotor of the wind turbine are modified in an embodiment of the invention.

FIG. 3 is a cross-sectional view showing how the stator 8 and generator rotor 4 are modified in an embodiment of the invention.

We first consider the components which make up the stator 8. The stator 8 comprises the stator spokes 10 which support a stator support rim 30, which in turn supports a windings housing 32 which contains the electrical windings 34 of the stator 8. The windings housing 32 has a cross-sectional shape, as shown in FIG. 3, which has a flat middle section 36 with a thicker outer rim section 38 and a thicker inner rim section 40. The outer and inner rim sections 38 and 40 are made thicker than the flat middle section 36 so that they can properly accommodate turns of the electrical windings 34 as shown in FIG. 3. The windings housing 32 is connected to the stator rim support 30 by a series of spaced supports 42 with gaps 44 therebetween. In FIG. 3 the spaced supports 42 and gaps 44 are shown by a shaded area 42/44, and in FIG. 2 the spaced supports 42 and gaps 44 are individually visible and are individually labeled.

FIG. 3 also shows details of the generator rotor 4. The generator rotor 4 comprises two magnet support structures 46, which may be formed from plates, and which extend around the circumference of the generator rotor 4, to the inside of which are fixed permanent magnets 48. The magnet support structures 46 and magnets 48 are positioned on either side of the flat middle section 36 of the windings housing 32, and the outer and inner rim sections 38 and 40 of the windings housing 32 project beyond the magnet support structures 46 and magnets 48. The magnet support structures 46 are supported by the supporting members 20 described above, and shown in FIG. 2. However the supporting members 20 are omitted from FIG. 3 for clarity.

We next describe features of FIG. 3 which relate to air cooling of the generator. These features are omitted from FIGS. 1 and 2 for clarity. FIG. 3 shows the addition of three wind guides which redirect air flow through the generator and cause cooling of the generator windings 34. These wind guides are described below.

On the up-wind (wind-facing) side of the generator an inner wind guide 50 is fixed to the inner edge of the magnets 48, or alternatively to the magnet support structure 46, adjacent the inner rim section 40 of the windings housing 32. Also on the wind-facing side of the generator, an outer wind guide 52 is fixed to the outer edge of the magnets 48, or alternatively to the magnet support structure 46, adjacent the outer rim section 38 of the windings housing 32. During operation the inner wind guide 50 directs a fast flow of air into the air gap between the magnets 48 and the windings housing 32 on the wind-facing side of the generator. The outer wind guide 52 protects the outer rim section 38 of the windings housing from the oncoming wind, and thus creates a lower pressure, ie. suction, which allows the flow of air through the air gap and out of the air gap around the outer rim section 38 of the windings housing 32, as shown by the air flow arrows in FIG. 3.

On the down-wind side of the generator, a downstream wind guide 54 is fixed to the stator support rim 30 and curves out around the inner rim section 40 of the windings housing 32, so as to direct air which has flowed through the gaps 44 into the air gap between the windings housing 32 and the magnets 48 on the downstream side of the generator, as shown by the air flow arrows in FIG. 3. As shown in FIG. 3, the downstream wind guide 54 is provided with a brush 56 which rests against the inner edge of either the magnets 48 or the magnet support structure 46, or both, on the downstream side of the generator, to help prevent air loss. In an alternative embodiment the downstream wind guide 54 may instead be fixed to the magnets 48 and/or the magnet support structure 46, and the brush 56 may instead rest against the stator support rim 30.

Figure 4:
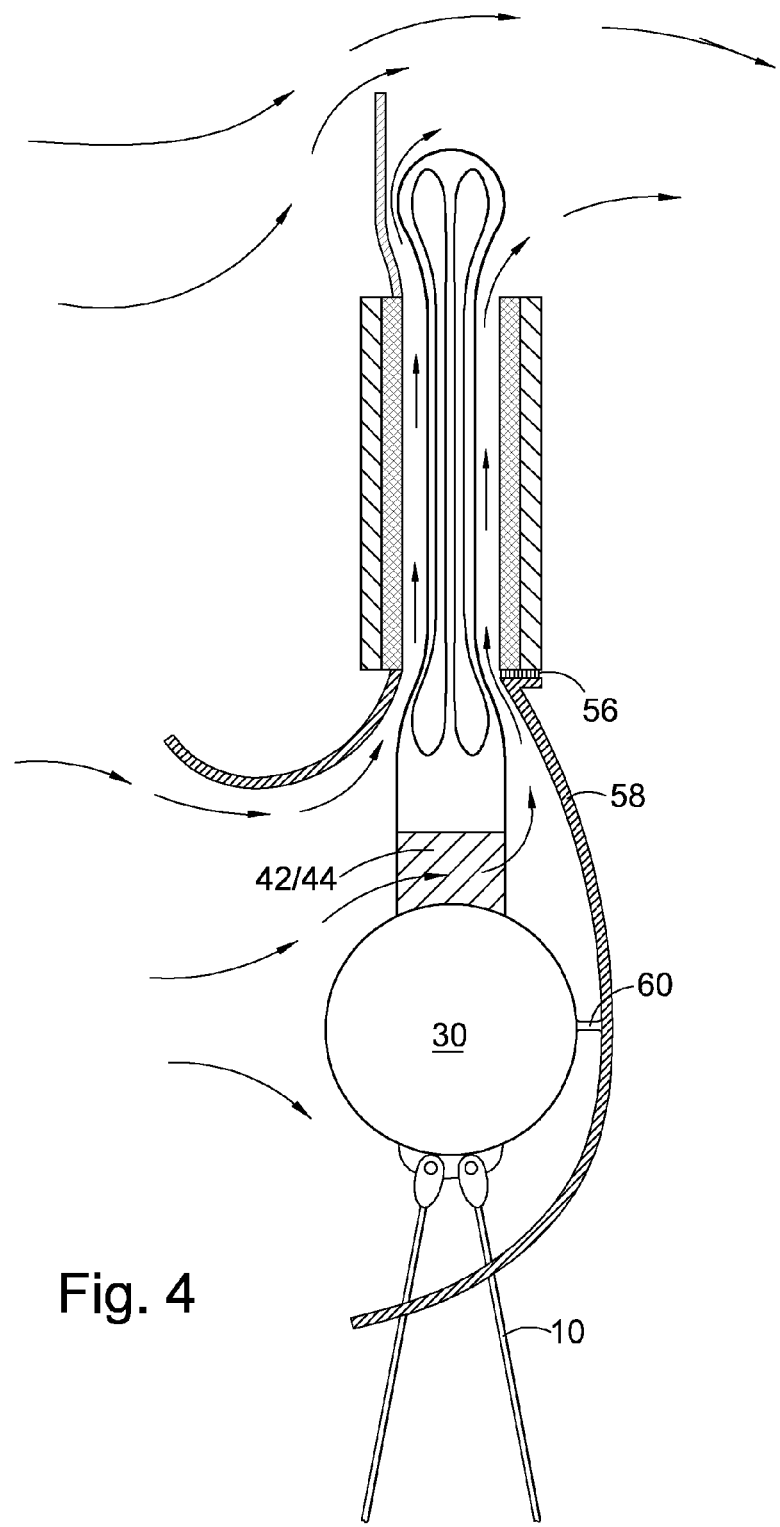
FIG. 4 shows an alternative embodiment of the invention.

An alternative embodiment is shown in FIG. 4, in which the downstream wind guide 54 is replaced by an enlarged downstream wind guide 58, which may be fixed to the stator support rim 30 by a support 60. The enlarged downstream wind guide 58 is able to redirect both air which has passed through the gaps 44 and also air which has passed between the spokes 10 of the stator 8, thus creating an increased air flow through the downstream generator air gap. Apart from the enlarged downstream wind guide 58 and its support 60, the other components of the embodiment of FIG. 4 are the same as those of FIG. 3.

Although the embodiments of FIGS. 3 and 4 are described as using three wind guides, some cooling of the generator windings 34 is achieved if at least one wind guide is used. For example, in FIG. 3 or 4 the inner and outer wind guides 50 and 52 could be removed, and only the downstream wind guide 54, 58 provided. In general, any combination of one or more of the wind guides may be employed.

We comment here on the size of the wind guides. Preferably, in a cross-sectional view taken in a plane which contains said axis, any one or more of said wind guides has a length which is at least 15 percent of the radial length of the air gap between the stator and magnets.

We comment here on the speed of air flowing through the air gap during use. Preferably, for a wind speed of at least 14 m/s, the wind guide or guides cause air to flow through the air gap(s) at a speed of at least 15 m/s.

Various variations are possible. For example, the inner wind guide 50 could be fixed to the stator 8, for example to the stator support rim 30, instead of to the generator rotor 4, so as to direct wind into the upstream air gap.

Although the preferred embodiment uses magnets on the generator rotor and electrical windings on the stator, it is possible to reverse these and use electrical windings on the generator rotor and magnets on the stator. This option is generally less preferred as it would require slip rings on the generator rotor to conduct the generated electricity away from the generator rotor. An example of such an alternative embodiment, the embodiment of FIG. 3 can be modified so that the stator 8, carrying the electrical windings 34, becomes rotatable about the shaft 6 (so that the stator 8 becomes a rotor), and the generator rotor 4, carrying the magnets 48 can be fixed in position relative to the shaft 5 (so that the generator rotor 4 becomes a stator). In this case the electrical windings 34 are still positioned between the magnets 48, in the same way as in the embodiment of FIG. 3, but the electrical windings 34 instead for part of a generator rotor (rather than a stator).

The shapes of the wind guides 50, 52, 54, 58 in the embodiments of FIGS. 3 and 4 are exemplary. It will be appreciated that wind guides of different shapes and sizes may be used in order to create the required air flow. If only one wind guide is used, this may be shaped so that wind is directed through the two air gaps on both sides of the generator windings 34. For example it will be appreciated that the downstream wind guide 58 of FIG. 4 will cause wind to be directed through the air gaps on both sides of the generator windings 34, even if this wind guide is used without the inner and outer wind guides 50 and 52 (labeled in FIG. 3).

The invention claimed is:

1. A wind turbine axial flux generator for converting wind into electricity, the generator comprising:
  a generator rotor which is rotatable about an axis; and
  a stator;
  wherein one of said generator rotor and said stator is provided with magnets and the other is provided with electrical windings in which electricity is induced by relative movement between the generator rotor and the stator;
  and wherein said generator further comprises:
  an up-wind air gap on the up-wind side of said electrical windings, between said electrical windings and at least some of said magnets on the up-wind side of said electrical windings;
  a down-wind air gap on the down-wind side of said electrical windings, between said electrical windings and at least some of said magnets on the down-wind side of said electrical windings; and
  at least one wind guide for directing said wind so that said wind flows through both said up-wind air gap and said down-wind air gap in order to cool said electrical windings from both said up-wind and down-wind sides of said electrical windings.

2. A wind turbine generator as claimed in claim 1, wherein in a cross-sectional view taken in a plane which contains said axis, said at least one wind guide has a length which is at least 15 percent of the radial length of at least one of said air gaps.

3. A wind turbine generator as claimed in claim 1, wherein for a wind speed of at least 14 m/s, said at least one wind guide causes air to flow through said air gaps at a speed of at least 15 m/s.

4. A wind turbine generator as claimed in claim 1, wherein each of said air gaps has an inner opening and an outer opening, said outer opening being positioned radially outwards of said inner opening, and wherein said generator has an outer wind guide which is arranged to at least partially protect said outer openings of said air gaps against said wind so that during use said wind does not force air into said outer openings.

5. A wind turbine generator as claimed in claim 4, wherein said outer wind guide is fixed to said generator rotor.

6. A wind turbine generator as claimed in claim 1, wherein each of said air gaps has an inner opening and an outer opening, said outer opening being positioned radially outwards of said inner opening, and wherein said generator has an inner wind guide which is arranged to direct air from said wind into at least one of said inner openings.

7. A wind turbine generator as claimed in claim 6, wherein said inner wind guide is fixed to said generator rotor.

8. A wind turbine generator as claimed in claim 7, wherein said inner wind guide is fixed to an inner edge of said generator rotor and curves outwardly, away from said stator, in a direction towards the oncoming wind.

9. A wind turbine as claimed in claim 6, wherein said inner wind guide is fixed to said stator.

10. A wind turbine generator as claimed in claim 1, which further comprises a downstream wind guide which directs said wind into said down-wind air gap.

11. A wind turbine generator as claimed in claim 10, wherein said downstream wind guide is fixed to said stator.

12. A wind turbine generator as claimed in claim 11, wherein said downstream wind guide is provided with a brush which is in contact with said generator rotor.

13. A wind turbine generator as claimed in claim 10, wherein said downstream wind guide is fixed to said generator rotor.

14. A wind turbine generator as claimed in claim 13, wherein said downstream wind guide is provided with a brush which is in contact with said stator.

15. A wind turbine generator as claimed in claim 10, wherein said stator is provided with gaps which allow at least some of said wind to pass through the stator, and wherein said downstream wind guide is positioned at least partially downwind of said stator so as to direct at least some of the wind which has passed through said stator into said down-wind air gap.

16. A wind turbine generator as claimed in claim 15, wherein said stator comprises a stator support rim which supports said electrical windings or magnets, and which is positioned radially inside the electrical windings or magnets supported by the stator support rim, and wherein at least some spaces are provided between said stator support rim and the electrical windings or magnets supported by the stator support rim, and wherein said downstream wind guide is arranged to direct into said down-wind air gap at least some of said wind which has passed through said spaces.

17. A wind turbine generator as claimed in claim 16, wherein said downstream wind guide is attached to said stator support rim.

18. A wind turbine generator as claimed in claim 10, wherein said stator is provided with radially extending spokes, and wherein said downstream wind guide is arranged to direct into said down-wind air gap at least some of said wind which has passed through spaces between said spokes.

19. A wind turbine generator as claimed in claim 1, wherein said stator comprises openings which allow at least some of said wind to pass through said stator, and wherein a blockage is provided on the down-wind side of the stator which forces at least some of said wind, which has passed through said stator, into said down-wind air gap.

20. A wind turbine generator as claimed in claim 1, wherein said at least one wind guide comprises at least two wind guides.

21. A wind turbine generator as claimed in claim 1, wherein said at least one wind guide comprises at least three wind guides.

22. A wind turbine generator as claimed in claim 1, wherein said outer wind guide projects radially outwards beyond said electrical windings and/or beyond said stator.

* * * * *